June 30, 1964 P. D. WALSH 3,139,251
LAMP MOUNTING ASSEMBLY
Filed May 15, 1961 2 Sheets-Sheet 1
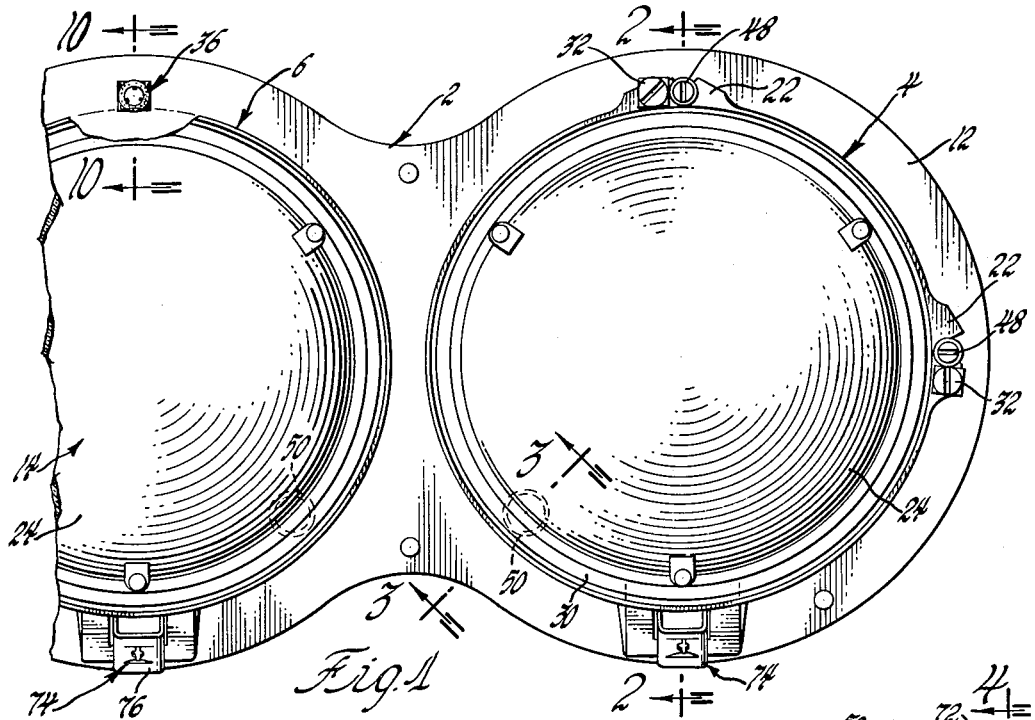
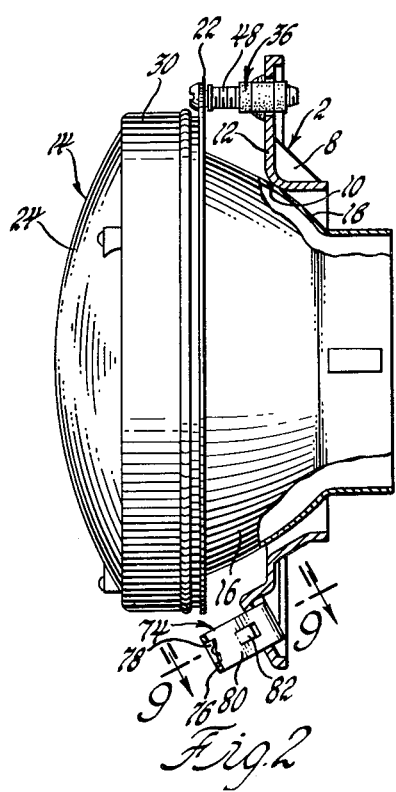
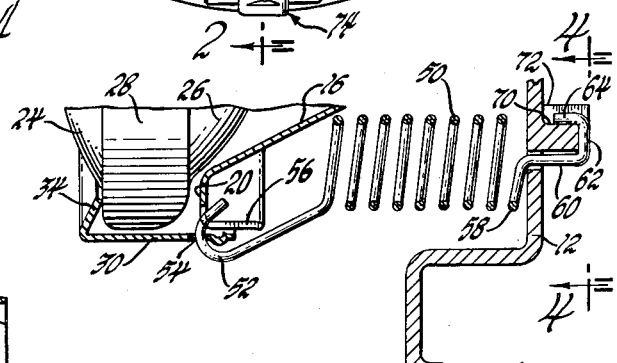
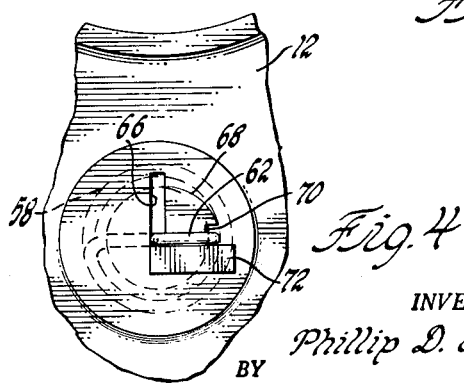
INVENTOR.
Phillip D. Walsh
BY
ATTORNEY

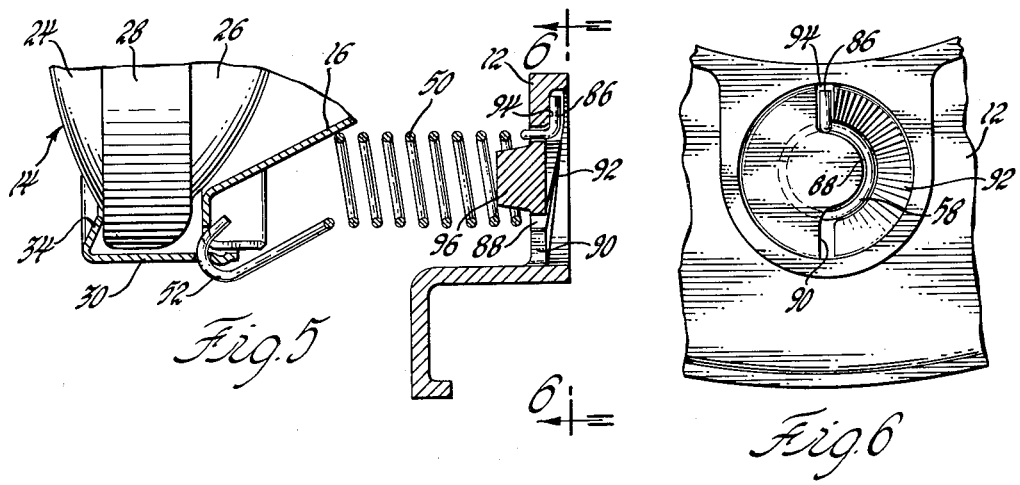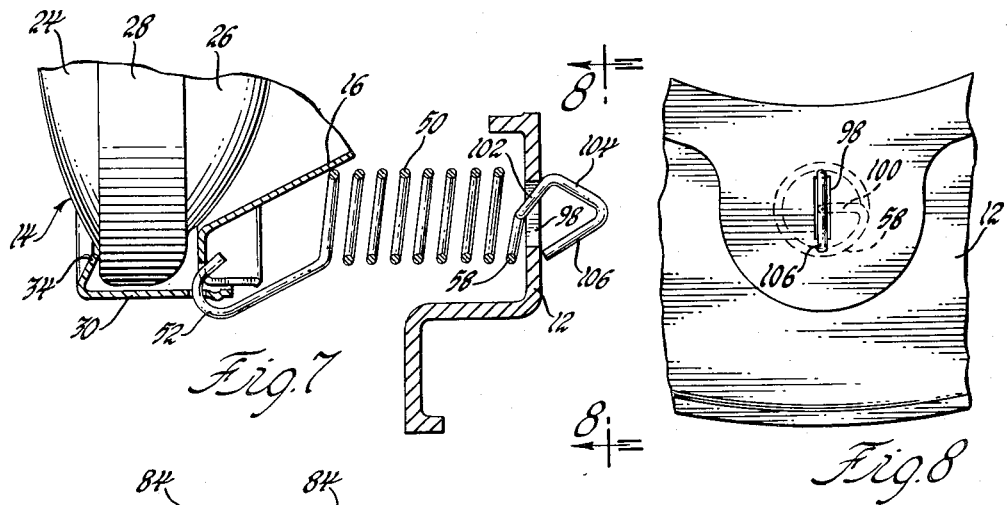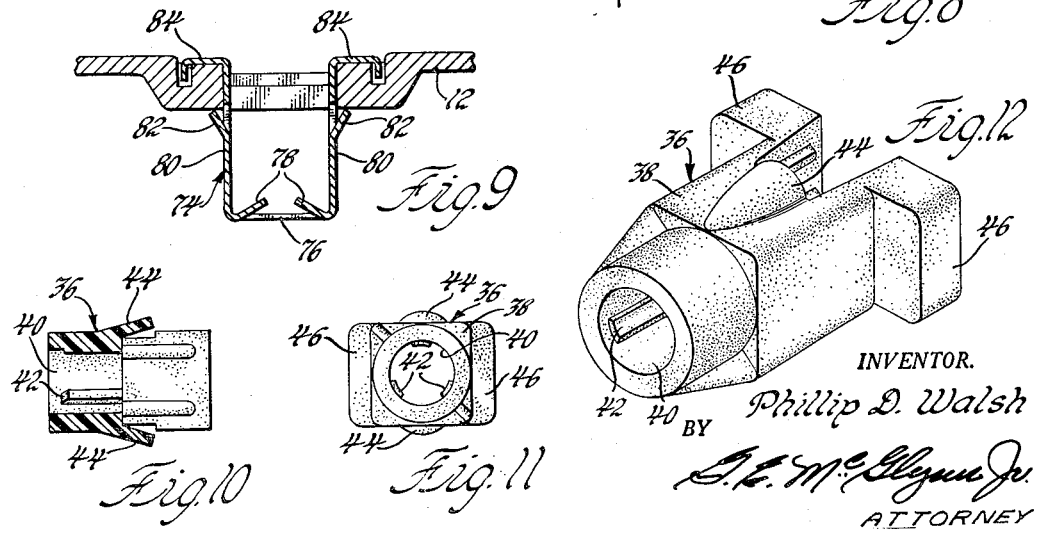

United States Patent Office 3,139,251
Patented June 30, 1964

1

3,139,251
LAMP MOUNTING ASSEMBLY
Phillip D. Walsh, Anderson, Ind., assignor to General Motors Corporation, Detroit, Mich., a corporation of Delaware
Filed May 15, 1961, Ser. No. 110,213
7 Claims. (Cl. 248—27)

This invention relates to a lamp mounting and, more particularly, to a ball and socket type mounting for vehicle headlamps.

Lamp mountings referred to herein as being of the ball and socket type are well known in the art, and are used to mount headlamps on vehicles. A typical type of ball and sprocket lamp mounting comprises a ball member, a socket member, and means operatively adjustably interconnecting these members. More specifically, the ball member includes a suitable lamp operatively secured within a mounting ring having a bearing surface adjustably mounted within a socket member on a support adapted to be fixedly secured to a vehicle. The adjustable connection between the ball and socket members includes a plurality of spaced aiming screws connected to the mounting ring and each adjustably threadably engaging a nut carried by the support, and a mounting or adjusting spring connected between the fixed support and the ball member at a point spaced from the aforementioned aiming screws. The aiming screws and spring cooperate to hold the ball member in its socket, and permit selective adjustment of the ball member to aim the lamp thereof. In mounts of this type, it has been the usual practice to rivet or otherwise fasten a bracket to the support for the ball member, and connect the mounting spring to this bracket.

It is a principal object and feature of this invention to provide an improved lamp mounting of the ball and socket type aforementioned which will facilitate assembly of the construction and reduce its cost.

More specifically, it is an object and feature of this invention to provide an improved ball and socket headlamp mounting in which the aforementioned adjusting or mounting spring may be mounted directly to the support which includes the socket member, thereby avoiding the need for an intermediate mounting bracket riveted or otherwise fastened to the support.

It is yet another object and feature of this invention to provide a mounting spring of the type aforedescribed in combination with a ball and socket type of lamp mounting which may be easily removably connected to the support of the mounting assembly without requiring the use of a riveted intermediate mounting bracket as in the prior art.

It is yet another object and feature of this invention to provide an improved ball and socket type of lamp mounting characterized by a mounting spring adapted to have its opposite ends removably connected respectively to the ball member and support of the assembly without requiring any intermediate mounting brackets riveted thereto.

In general, these and other objects, features and advantages of the invention are attained in a headlamp mounting of the ball and socket type comprising the usual lamp-receiving mounting ring having a bearing surface, and a support including a socket for the mounting ring. Plural spaced aiming screw and nut assemblies are provided for adjustably supporting the mounting ring in the aforementioned socket, and cooperate with a mounting spring having its opposite ends removably connected to the ball member and support of the mounting assembly. The connection of the one end of the spring to the support includes an end portion thereof formed integral with an adjacent end coil, and adapted to be removably insertable through a suitable slot or opening in the support. This

2 end portion of the spring is so formed as to yieldably engage a seat on the support to retain the spring thereon. Consequently, such a mounting spring is mounted directly on the support without the use of rivets or other fasteners or intermediate mounting brackets.

These and other objects and features of the invention and the manner in which they are attained will become more apparent hereinafter as the description of the invention proceeds, and in which reference is made to the drawings in which:

FIGURE 1 is a fragmentary front elevation of a preferred embodiment of the invention;

FIGURE 2 is a view taken on line 2—2 of FIGURE 1;

FIGURE 3 is an enlarged view taken on line 3—3 of FIGURE 1;

FIGURE 4 is a view taken on line 4—4 of FIGURE 3;

FIGURE 5 is a view corresponding generally to FIGURE 3, but showing another embodiment of the invention;

FIGURE 6 is a view taken on line 6—6 of FIGURE 5;

FIGURE 7 is another view corresponding generally to FIGURE 3, but showing a third embodiment of the invention;

FIGURE 8 is a view taken on line 8—8 of FIGURE 7;

FIGURE 9 is an enlarged view taken on line 9—9 of FIGURE 2;

FIGURE 10 is an enlarged view taken on line 10—10 of FIGURE 1;

FIGURE 11 is an end view of FIGURE 10; and

FIGURE 12 is an enlarged perspective view of the aiming nut of FIGURES 10 and 11.

Referring now to FIGURES 1 through 6 inclusive and one preferred embodiment of the invention, FIGURE 1 in particular illustrates the now well known dual lamp assembly comprising a common support 2 and a pair of lamp assemblies 4 and 6. Since the mountings of each lamp assembly on the common support 2 are preferably substantially identical, further description of the invention will proceed with reference primarily to the mounting of the lamp assembly 4.

The support member 2 is adapted to be suitably rigidly secured to a vehicle such as the front fender construction thereof, and includes preferably three annularly or circumferentially spaced ribs 8 each having a curved bearing surface 10 which together cooperate to form an annular socket for the ball member of the assembly as will be described. An annular channel 12 on the support 2 is radially spaced from and surrounds the socket formed by the bearing surfaces 10.

The ball member 14 of the mounting assembly includes a cup-shaped mounting ring 16 having a substantially spherical annular exterior bearing surface 18, an annular peripheral mounting flange 20 and a pair of radially projecting ears 22 spaced substantially 90° apart on the periphery of the aforementioned flange. A suitable lamp, herein shown to be of the sealed beam type, includes hermetically sealed lens and reflector elements 24 and 26, respectively. The periphery of the reflector adjacent the sealed juncture 28 between the lens and reflector is provided with the usual mounting or seating lugs, not shown, which rest against the mounting ring flange 20. An annular retaining ring 30 is secured to the mounting ring by means of plural fasteners 32 engaging suitable ears on the retaining ring and respectively threadably engaging the ears 22 on the mounting ring. The retaining ring also includes a radially inwardly bent annular lip 34 which engages the juncture 28 on the lamp so that, upon installing the retaining ring on the mounting ring as aforedescribed with the lamp confined therebetween, the retaining ring retains the lamp in operative seated relationship within the mounting ring 16. Thus, the ball member of the mounting assembly includes the mounting ring 16, the lamp, and the retaining ring 30 which are operatively secured together as a unit by means of the fasteners 32.

As is shown particularly in FIGURE 2, the mounting ring surface 18 is seated within the socket formed by the spaced bearing surfaces 10 of the ribs 8. The mounting ring is retained in any selected adjusted position within its socket by means of adjustable aiming screw and nut assemblies operatively connecting the ball member 14 and support 2 at points spaced substantially 90° apart, and in cooperation with a mounting spring having its opposite ends removably connected to the ball member 14 and the support 2 in a manner to appear more fully hereinafter.

Referring now particularly to FIGURES 10 through 12 inclusive, there is illustrated a snap-in type aiming nut 36, preferably molded of nylon or similar material, and comprising a body 38 having a rectangular cross section, and a bore 40 therethrough including a plurality of circumferentially spaced axially extending ribs 42. An inclined radially yieldable retaining barb 44 projects from each of two opposite walls of body 38, while a locking shoulder 46 projects from each of the other walls thereof at a position spaced axially rearwardly from the retaining nut.

The channel 12 of the suport 2 includes at least two suitably shaped apertures therein spaced 90° from each other to receive an aiming nut previously described. Therefore, and as will be apparent particularly from FIGURE 2, the body 38 of the aiming nut is inserted into such apertures from the rear of the channel 12 causing the barbs 44 to yield radially inwardly upon passing through the aperture and then springing outwardly to engage the front surface of the channel. At this time the locking shoulders 46 engage the rear surface of the channel so as to lockingly retain the aiming nuts on the support 2. The adjustable aiming screws 48 each has a head received in a suitable slot on the ears 22 of the mounting ring, and are threadably received within the bore 40 of each aiming nut. In this regard the ribs 42 are self-tapping upon insertion of the aiming screw so as to threadably hold the aiming screw in any selected adjusted position within the nut.

The axially coiled mounting spring 50 includes a hook 52 at one end thereof adapted to be removably engaged within a suitable aperture 54 formed in the retaining ring 30, a slot 56 being provided in the periphery of the mounting ring 16 to accommodate the end of this hook. The other end of the spring includes an end coil 58 terminating in an integral end portion of generally U-shaped configuration and including one leg 60 projecting beyond the end coil axially of the spring, a radially projecting base leg 62 and a yieldable locking tang 64 extending parallel to the leg 60 and the axis of the spring and radially spaced from the latter.

An elongate relatively narrow rectangular slot 66 is formed through the channel 12 with one end thereof substantially aligned with the axis of the spring and extending radially thereof to terminate at a point substantially aligned with the periphery of the spring. An arcuate ramp 68 projects from the rear surface of channel 12 and has one end thereof adjacent the slot 66. A depressed seat or notch 70 is formed at the other end of the ramp adjacent a stop lug 72 also projecting from the rear surface of the channel 12. It will be noted from FIGURE 4 that the end of the ramp 68 immediately adjacent the slot is more closely located to the axis of the coil spring than is the other end of the ramp adjacent the seat 70; that is the distance between the surface of the ramp and the axis of the spring progressively increases from the slot 66 toward the seat 70. Furthermore, it will be obvious that the radial spacing of tang 64 from leg 60, which is coincident with the axis of the spring, is slightly greater than the distance between the center of the spring and the ramp end adjacent the slot, while less than such distance to the other end of the ramp.

The coiled spring 50 is removably installed or connected on support 2 by first inserting the end portion of the spring through the slot 66 so as to engage the end coil 58 against the front surface of the channel 12 and dispose the end portion of the spring including the locking tang 64 on the other side of the channel. The spring is then rotated approximately 90° about its axis causing the tang 64 to ride along the surface of the ramp 68 until it reaches and drops into the seat 70 in abutment with the stop lug 72. It will be immediately apparent that rotation of the spring in this manner causes the tang to be easily fed onto the lower end of the ramp, the tang then yielding radially outwardly as it passes up the ramp and then springing back into the seat 70 to securely lock the spring to the channel.

After mounting the lamp assemblies 4 and 6 as illustrated in FIGURE 1, the usual trim door or bezel (not shown) is adapted to be suitably secured to the common support 2 by means of at least two snap-in brackets 74 adapted to threadably receive fasteners engaging the aforementioned door. Referring particularly to FIGURES 1, 2 and 9, it may be seen that these brackets are generally U-shaped in cross section and include a base leg 76 suitably apertured and including opposed yieldable locking member 78 adapted to receive the threaded fastener for the door. The side legs 80 of the bracket each include outwardly struck yieldable barbs 82 adapted to engage the front surface of channel 12. The side legs of these brackets each terminate in laterally outwardly projecting locking flanges 84 including forwardly struck terminal edges adapted to seat in suitable recesses in the rear face of the channel. Thus, it may be seen that the brackets 74 may be mounted on the channel 12 without the use of rivets or other similar fasteners merely by inserting the base wall 76 and legs of the bracket through a suitable aperture in the channel from the rear of the latter, whereby the barbs 82 spring inwardly until they pass through the aperture and then spring to their original position to engage the front surface of the support member. At this time, the flanges at the base of the bracket are firmly nested and seated against the rear surface of the channel as appears in FIGURE 9.

FIGURES 5 and 6 illustrate another embodiment of the invention, like numerals being employed to illustrate structure previously described. In this embodiment, the end coil 58 of the axially coiled spring 50 terminates at the periphery of such coil in a radially projecting yieldable locking tang 86. As appears particularly in FIGURE 6, a slot is again formed through the channel 12, but includes a semicircular portion 88 having the same radius of curvature as the coils of the spring and a radially projecting end portion 90. An inclined arcuately shaped cam ramp 92 has its lower end merged with the rear surface of the channel adjacent the slot portion 90, and slopes upwardly and away from channel 12 and around the semicircular portion of the slot to terminate at its other end in a depressed seat or notch 94. A lug 96 projects axially from the front surface of the channel so as to pilot the coiled spring thereabout when installing it on the support.

To install the spring of this embodiment on the support, one half of the end coil 58 including the locking tang 86 are first inserted within the slot 88, 90 in the support. Thereafter, the coil is rotated substantially 180° about its axis causing the locking tang 86 to enter the lower end of the ramp 92 and then yield axially as it rides up the ramp until it springs back into the seat 94.

Referring now to a third embodiment of the invention as shown in FIGURES 7 and 8, like numerals again being employed to illustrate structure previously described, it will be seen that a relatively narrow elongate slot 98 is provided through the channel 12 in much the same fashion as previously described relative to the embodiment shown particularly in FIGURE 4. However, unlike the previous embodiment, the slot 98 extends almost diametrically of the spring. Furthermore, in this embodiment, the end portion of the spring formed integral with the end coil 58 includes a leg portion 100 extending radially of the spring to a point substantially aligned with the axis of the latter. At this point the terminal portion of the spring wire is bent reversely upon itself to form a bight spaced axially from the end coil and including the leg portions 102 and 104 and yieldable locking tang 106 which are contained in a plane extending diametrically of the spring barrel. When unstressed, the distance between the end of tang 106 and the bend between legs 102 and 104 is greater than the length of slot 98.

In installing the spring of this embodiment on the channel 12, the terminal portion of the spring including legs 102 and 104 and tang 106 is merely thrust through the slot 98, the locking tang 106 yielding inwardly toward the axis of the spring to permit such passage. The end coil 58 of the spring then abuts the front surface of the channel, at which time the bend between legs 102 and 104 seats against the rear surface of the channel and the extreme end of the locking tang 106 has passed through the slot and springs radially outwardly to its unstressed position engaging the rear surface of the channel.

While three forms of the invention have been shown and described, other forms will now be apparent to those skilled in the art. Therefore, the embodiments shown in the drawing are merely for illustrative purposes, and are not intended to limit the scope of the invention which is defined by the claims which follow.

I claim:

1. In a ball and socket lamp mounting of the type including an axially coiled spring having its opposite ends respectively connected to said ball member and to said socket to urge said ball member against said socket member; a connection between the one end of said coiled spring and said socket comprising an end coil on said spring, a resilient locking tang formed integral with and projecting from said end coil, an opening in said socket, said tang being insertable through said opening to engage said end coil with one side of said socket and to disposed said tang on the other side thereof, and an inclined ramp on the other side of said socket having a lower end communicating with said opening and an upper end including a seat for said tang, said spring being rotatable about its axis to move said tang up said ramp until it engages said seat.

2. In a ball and socket lamp mounting of the type including axially coiled spring having its opposite ends respectively connected to said ball member and to said socket to urge said ball member against said socket member; a connection between the one end of said coiled spring and said socket comprising an end coil on said spring, a resilient locking tang formed integral with said end coil and spaced radially from the axis of said spring, an opening in said socket smaller than the diameter of said end coil, said tang being insertable through said opening to engage said end coil with one side of said socket and to disposed said tang on the other side thereof, and an inclined arcuately curved ramp on the other side of said socket having a lower end communicating with said opening and an upper end including a seat for said tang, said spring being rotatable about its axis to move said tang up said ramp until it engages said seat.

3. In a ball and socket lamp mounting of the type including an axially coiled spring having its opposite ends respectively removably connected to said ball member and to said socket to urge said ball member against said socket member; a connection between the one end of said coiled spring and said socket comprising an end coil on said spring, a resilient locking tang formed integral with and spaced axially from said end coil and spaced radially from the axis of said spring, a slot in said socket in a plane extending diametrically of said spring, said tang being insertable through said slot to engage said end coil with one side of said socket and to dispose said tang on the other side thereof, and an inclined arcuately curved ramp on the other side of said socket having a lower end adjacent said slot and an upper end including a depressed seat for said tang, said spring being rotatable about its axis whereby said tang yields as it moves up said ramp and then springs back to engage said seat.

4. In a ball and socket lamp mounting of the type including axially coiled spring having its opposite ends respectively connected to said ball member and to said socket to urge said ball member against said socket member; a connection between the one end of said coiled spring and said socket comprising an end coil on said spring, a resilient locking tang formed integral with said end coil and extending substantially parallel to the axis of said spring and spaced radially from the latter, a slot in said socket in a plane extending diametrically of said spring, said tang being insertable through said slot to engage said end coil with one side of said socket and to dispose said tang on the other side thereof, and an inclined arcuately curved ramp on the other side of said socket spaced radially from the axis of said spring and having a lower end adjacent said slot and an upper end including a seat for said tang, said spring being rotatable about its axis to move said tang up said ramp until it engages said seat.

5. In a ball and socket lamp mounting of the type including an axially coiled spring having its opposite ends respectively removably connected to said ball member and to said socket to urge said ball member against said socket member; a connection between the one end of said spring and said socket comprising an end coil on said spring, a resilient locking tang formed integral with said end coil and spaced radially from and extending substantially parallel to the axis of said spring, a slot in said socket in a plane extending diametrically of said spring, said tang being insertable through said slot to engage said end coil with one side of said socket and to dispose said tang on the other side thereof, an arcuately curved ramp on the other side of said socket spaced radially from the axis of said spring, said ramp having an inner end communicating with said slot and an outer end spaced from the axis of said spring a distance greater than the spacing of the inner end therefrom, and a depressed seat at the outer end of said ramp, said spring being rotatable about its axis to move said tang up said ramp until it springs into engagement with said seat.

6. In a ball and socket lamp mounting of the type including axially coiled spring having its opposite ends respectively connected to said ball member and to said socket to urge said ball member against said socket member; a connection between the one end of said coiled spring and said socket comprising an end coil on said spring, a resilient locking tang formed integral with said end coil and projecting radially therefrom, an opening in said socket, said tang being insertable through said opening to engage said end coil with one side of said socket and to dispose said tang on the other side thereof, and an inclined ramp on the other side of said socket spaced radially from and curved about the axis of said spring, said ramp having a lower end adjacent said slot and an upper end including a seat for said tang, said spring being rotatable about its axis to move said tang up said ramp until it engages said seat.

7. In a ball and socket lamp mounting of the type including an axially coiled spring having its opposite ends respectively removably connected to said ball member and to said socket to urge said ball member against said socket member; a connection between the one end of said coiled spring and said socket comprising an end coil on said spring, a resilient locking tang formed integral with and projecting radially from said end coil, a slot in said socket including a semicircular portion having a radius of curvature substantially equal to that of said end coil and a terminal portion projecting radially therefrom, at least a portion of said end coil and said tang being insertable through the respective portions of said slot to engage another portion of said end coil with one side of said socket and to dispose said tang on the other side thereof, an inclined ramp on the other side of said socket spaced radially from and curved about the axis of said spring, said ramp having a lower end adjacent said terminal portion of said slot and an upper end spaced from said socket, and a depressed seat at the upper end of said ramp, said spring being rotatable about its axis to move said tang up said ramp until it yieldingly engages said seat.

References Cited in the file of this patent

UNITED STATES PATENTS

| | | |
|---|---|---|
| 1,465,193 | Tew | Aug. 14, 1923 |
| 2,109,576 | Place | Mar. 1, 1938 |
| 2,145,419 | Hoppkins | June 31, 1939 |
| 2,266,329 | Mead et al. | Dec. 16, 1941 |
| 2,618,033 | Tinnerman | Nov. 18, 1952 |
| 2,800,578 | Falge | July 23, 1957 |

UNITED STATES PATENT OFFICE
CERTIFICATE OF CORRECTION

Patent No. 3,139,251                        June 30, 1964

Phillip D. Walsh

It is hereby certified that error appears in the above numbered patent requiring correction and that the said Letters Patent should read as corrected below.

Column 1, line 15, for "sprocket" read -- socket --; column 3, line 29, for "nut" read -- barbs 44 --; column 5, lines 47 and 64, for "disposed", each occurrence, read -- dispose --.

Signed and sealed this 12th day of January 1965.

(SEAL)
Attest:

ERNEST W. SWIDER
Attesting Officer

EDWARD J. BRENNER
Commissioner of Patents